(12) United States Patent
Kolda

(10) Patent No.: US 7,118,016 B1
(45) Date of Patent: Oct. 10, 2006

(54) ADJUSTABLE RACK FOR CARRYING EQUIPMENT ON A VEHICLE

(75) Inventor: Clint D. Kolda, Cottage Grove, WI (US)

(73) Assignee: Saris Cycling Group, Inc., Madison, WI (US)

( * ) Notice: Subject to any disclaimer, the term of this patent is extended or adjusted under 35 U.S.C. 154(b) by 361 days.

(21) Appl. No.: 10/157,426

(22) Filed: May 29, 2002

(51) Int. Cl.
  B60R 11/00 (2006.01)
  B60R 9/00 (2006.01)
(52) U.S. Cl. ............. 224/500; 224/314; 224/321; 224/924; 224/281; 224/282; 224/497; 224/504
(58) Field of Classification Search .......... 224/309, 224/314, 321, 917.5, 924, 281, 282, 497, 224/502, 504–506, 510
See application file for complete search history.

(56) References Cited

U.S. PATENT DOCUMENTS

| | | | |
|---|---|---|---|
| 3,710,999 A | 1/1973 | Allen | |
| 3,927,811 A | 12/1975 | Nussbaum | |
| 4,061,257 A | * 12/1977 | St. Clair | 224/321 |
| 4,085,874 A | 4/1978 | Graber | |
| 4,109,839 A | 8/1978 | Allen | |
| RE29,840 E | 11/1978 | Wasserman | |
| 4,182,467 A | 1/1980 | Graber | |
| 4,332,337 A | 6/1982 | Kosecoff | |
| 4,336,897 A | 6/1982 | Luck | |
| 4,394,948 A | 7/1983 | Graber | |
| 4,428,516 A | 1/1984 | Allen | |
| 4,452,385 A | 6/1984 | Prosen | |
| 4,513,897 A | 4/1985 | Graber | |

(Continued)

FOREIGN PATENT DOCUMENTS

FR 2668435 4/1992

Primary Examiner—Tri M. Mai
(74) Attorney, Agent, or Firm—Boyle, Fredrickson, Newholm, Stein & Gratz, S.C.

(57) ABSTRACT

An equipment carrier, such as a bicycle rack, is adapted for removable mounting to a vehicle and includes a first frame and a second frame interconnected by one or more hubs. The first frame is engaged with the hubs so as to be axially movable relative to the lower frame and the hubs. The first frame defines a forward engagement area adapted for engagement with the rear of the vehicle, and the second frame defines an outer engagement area adapted to engage the vehicle at a location vertically spaced from the forward engagement area. The second frame is pivotably mounted to the hubs for movement between an operative extended position and an inoperative collapsed position. A variable position engagement arrangement is interposed between the hubs and the first frame, for selectively fixing the axial position of the first frame relative to the hubs. In one form, the variable position engagement arrangement includes an engagement member associated with the second frame which is movable into engagement with one of a series of axially spaced openings in the first frame when the lower frame is in its operative extended position. Movement of the second frame relative to the hubs away from its operative extended position functions to disengage the engagement member from the first frame openings, to enable the axial position of the first frame to be adjusted. Subsequent return of the second frame to its extended operative position functions to engage the engagement member with a different one of the openings, to fix the first frame in a different axial position relative to the second frame. In this manner, the configuration of the carrier can be adjusted according to the configuration of the vehicle to which the carrier is adapted to be mounted.

26 Claims, 6 Drawing Sheets

U.S. PATENT DOCUMENTS

| | | |
|---|---|---|
| 4,518,108 A | 5/1985 | Allen |
| 4,709,840 A | 12/1987 | Allen |
| 4,726,499 A | 2/1988 | Hoerner |
| 4,830,250 A | 5/1989 | Newbold et al. |
| 5,056,699 A | 10/1991 | Newbold et al. |
| 5,056,700 A | 10/1991 | Blackburn et al. |
| 5,118,020 A | 6/1992 | Piretti |
| 5,135,145 A | 8/1992 | Hannes et al. |
| 5,195,670 A | 3/1993 | Piretti et al. |
| 5,211,323 A | 5/1993 | Chimenti et al. |
| 5,305,936 A | 4/1994 | Nusbaum |
| 5,363,996 A | 11/1994 | Raaber et al. |
| 5,377,885 A | 1/1995 | Wyers |
| 5,435,472 A | 7/1995 | Allen et al. |
| 5,495,970 A | 3/1996 | Pedrini |
| 5,598,960 A | 2/1997 | Allen et al. |
| 5,645,202 A | 7/1997 | Kaloustian |
| D412,482 S | 8/1999 | Chen |
| 6,286,738 B1 | 9/2001 | Robins et al. |

\* cited by examiner

ADJUSTABLE RACK FOR CARRYING EQUIPMENT ON A VEHICLE

BACKGROUND AND SUMMARY OF THE INVENTION

This invention relates to vehicle-mounted equipment carriers, and more particularly to an equipment carrier adapted for removable mounting to the rear of a vehicle.

Various types of vehicle-mounted equipment carriers are known for enabling a user to mount one or more items of equipment, such as bicycles, skis, etc., to a vehicle for transport. Common types of equipment carries include trunk or rear-mounted carriers, hitch-mounted carriers and roof-mounted carriers.

In a rear or trunk-mounted type of carrier, it is typically desirable to tailor the configuration of the carrier according to the type of vehicle to which the carrier is to be mounted. Typically, prior art carriers of this type incorporate a variable position connection between the carrier frame and the support members that are adapted to support the one or more items of equipment. Examples of this type of carrier are shown in Graber U.S. Pat. Nos. 4,085,874; 4,182,467; and 4,394,948, as well as Piretti et al U.S. Pat. No. 5,195,670, the disclosures of which are hereby incorporated by reference. Pedrini U.S. Pat. No. 5,495,970, also incorporated by reference, discloses a carrier arrangement in which both the configuration of the frame as well as the position of the support members can be adjusted according to the configuration of the vehicle, with the frame and support components being adjustable about a common pivot axis.

It is an object of the present invention to provide an equipment carrier in which the configuration of the equipment carrier can be quickly and easily altered according to the configuration of the vehicle to which the equipment carrier is to be mounted. It is a further object of the invention to provide such an equipment carrier which is movable between an operative extended position for providing use of the carrier, and an inoperative collapsed position for storage. Yet another object of the invention is to provide such an equipment carrier in which the configuration of the equipment carrier is fixed in response to movement of one of the components of the equipment carrier, such as one of the carrier frames, to an operative position from an inoperative position for storage or adjustment. Yet another object of the invention is to provide such an equipment carrier having a relatively small number of components, which results in a relatively inexpensive cost of manufacture. A still further object of the invention is to provide such an equipment carrier which is relatively simple in its components and construction, yet which is capable of being quickly and easily reconfigured for use or moved to a collapsed condition for storage.

In accordance with the present invention, an equipment carrier adapted for mounting to a vehicle, such as to the rear area of a vehicle, includes an upper member or frame having an upper or forward engagement area adapted for engagement with the vehicle, and a lower member or frame having a lower engagement area adapted for engagement with the vehicle below the forward engagement area. A variable position engagement arrangement is interposed between the upper frame and the lower frame, for enabling adjustment in the axial position of the forward engagement area relative to the lower engagement area. A support arrangement is interconnected with the upper and lower frames for supporting one or more items of equipment. In one form, the support arrangement is in the form of a rearward extension of the upper frame. The upper frame may be constructed to include a pair of axially extending upper frame members, and the lower frame may be constructed to include a pair of lower frame members that extend outwardly from the upper frame members when the lower frame member is in its operative position. A hub member is interposed between each axially extending upper frame member and one of the lower frame members. Each lower frame member is movably mounted to one of the hub members for providing movement of the lower frame between its operative and inoperative positions, such as by means of a pivot connection between the hub member and the lower frame member. Each hub member preferably defines a passage within which one of the upper frame members is slidably received. In this manner, the upper frame is movable relative to the hub member, and thereby relative to the lower frame member mounted to the hub member, to provide adjustment in the position of the upper engagement area relative to the lower engagement area.

The variable position engagement arrangement is operable to selectively fix the position of the upper frame members within the hub members when the lower frame is in its operative position, so as to selectively fix the position of the forward engagement area of the upper frame relative to the lower engagement area of the lower frame. In one form, the variable position engagement arrangement includes a series of openings in each upper frame member. An engagement member is movable into a selected one of the openings when the lower frame is in its operative position. The engagement member may be mounted directly to an upper end defined by each lower frame member, with the upper and lower frame members being arranged and configured so as to position the engagement member within one of the upper frame member openings when the lower frame is in its operative position. A biasing arrangement may be associated with the engagement member, to urge the engagement member outwardly toward an extended engaged position relative to the upper end of the lower frame member. The biasing arrangement enables the engagement member to be moved to a retracted disengaged position, in the event the lower frame member is moved to its operative position and the engagement member is not in alignment with one of the openings in the upper frame member. The upper frame members can then be axially moved to a desired position while the lower frame is in its operative position, and the outward bias on the engagement members is operable to move the engagement members into one of the upper frame member openings when one of the openings is moved into alignment with the engagement member.

With this construction, the carrier can be collapsed by pivoting the lower frame relative to the hub members toward the upper frame, and the upper frame can be moved axially within the hub member passages to shorten the overall length of the collapsed carrier. In use, the upper frame is moved to a desired position relative to the hub members, and the lower frame is then moved to its operative position to move the engagement members into engagement with one of the openings in each upper frame member, to fix the position of the upper frame relative to the hub members, and thereby relative to the lower frame.

The invention also contemplates an improvement in an equipment carrier adapted for mounting to a vehicle, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
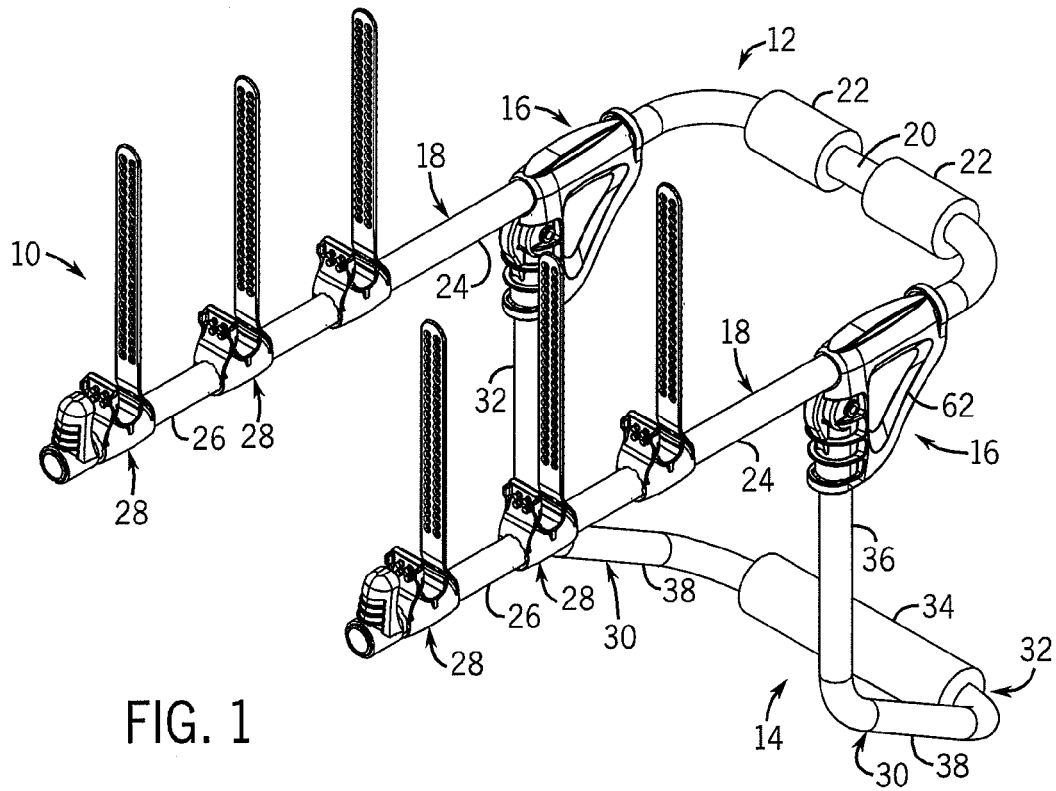
FIG. 1 is an isometric view of an equipment carrier constructed according to the present invention, in the form of a bicycle rack, illustrating the lower frame of the equipment carrier in its operative extended position.
Figure 2:
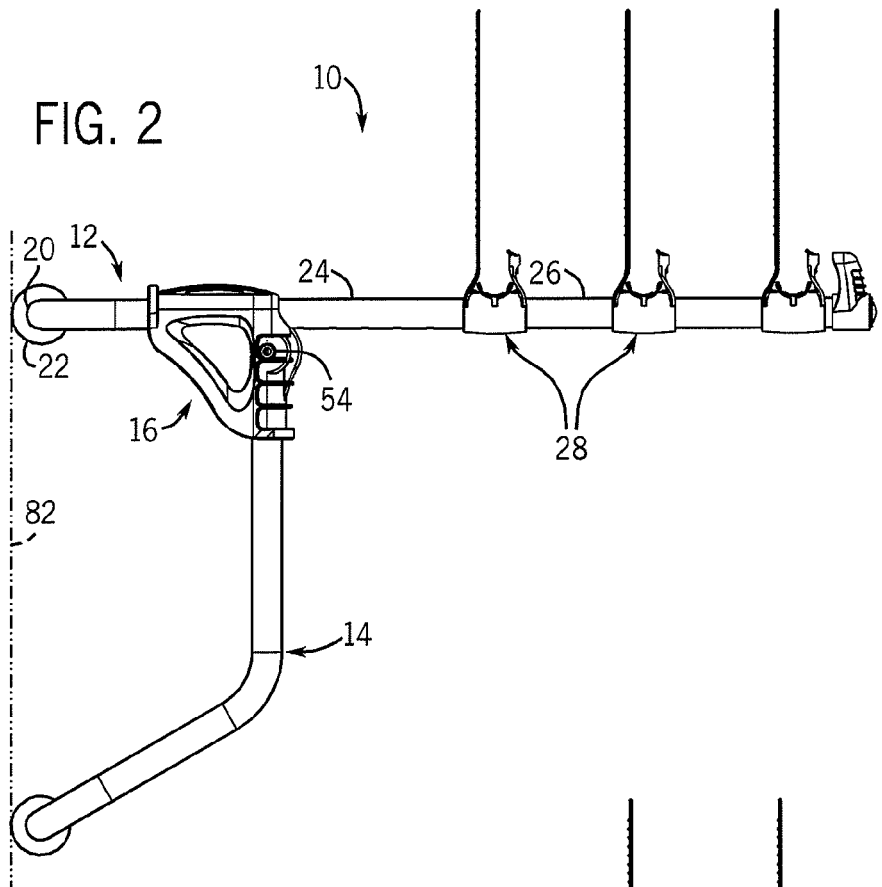
FIG. 2 is a side elevation view of the equipment carrier of FIG. 1, showing the lower frame in its operative extended position and the upper frame in a forward engagement position relative to the lower frame to place the upper engagement area of the upper frame in a rearward or retracted position.
Figure 3:
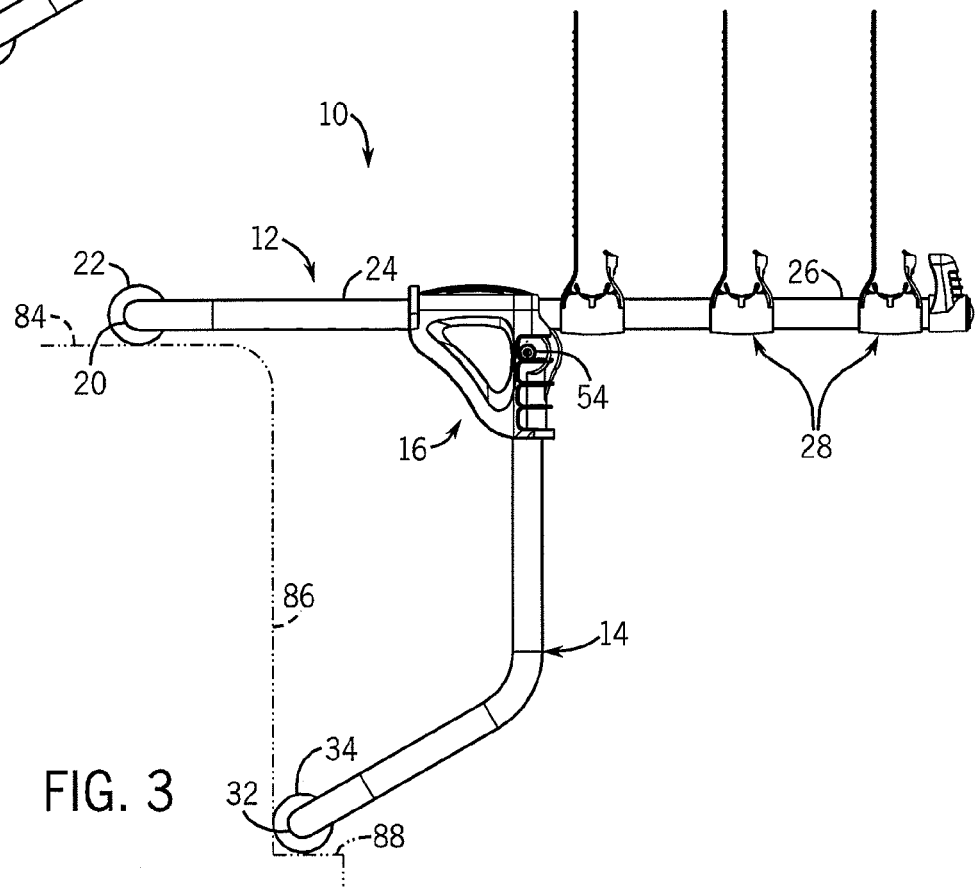
FIG. 3 is a view similar to FIG. 2, showing the upper frame in a rearward engagement position relative to the lower frame to place the upper engagement area of the upper frame in a forward or extended position.

Referring to FIGS. 1–3, an equipment carrier in accordance with the present invention, shown as a bicycle rack 10, generally includes an upper frame 12, a lower frame 14, and a pair of hubs 16 that serve to interconnect upper frame 12 and lower frame 14. Throughout the description, the terms "upper" and "lower" are used to describe the normal orientation of the components of the bicycle rack 10 when in use. It is understood, however, that such terms are not intended to be limiting as to the manner in which bicycle rack 10 may be used. Rather, such terms are used for purposes of convenience in describing and understanding the relationship of the components of bicycle rack 10 when employed in the manner illustrated in the drawings.

Upper frame 12 includes a pair of parallel axially extending upper frame members 18 interconnected by a transverse end member 20. A pair of resilient cushion members 22 are mounted to upper end member 20. Rearwardly of upper end member 20, each upper frame member 18 defines an axial hub engagement section 24 and an equipment support section 26. A series of spaced apart equipment engagement members, which are representatively illustrated as cradle-type equipment support members 28, are engaged with equipment support section 26 of each upper frame member 18 to mount equipment, such as bicycles, to equipment support sections 26 in a manner as is known.

End member 20 of upper frame 12 and cushion members 22 function to define an upper forward vehicle engagement area of bicycle rack 10, which is adapted to engage an upper area of the vehicle, in a manner to be explained.

Lower frame 14 includes a pair of side frame members 30 and a lower end frame member 32 which extends through a passage defined by a resilient lower cushion member 34. Each side frame member 30 includes an inner section 36 and an outer section 38, which are configured such that outer section 38 extends forwardly from the lower end of inner section 36. In this manner, inner section 36 and outer section 38 cooperate to define an obtuse angle when viewed from the side. In a manner to be explained, the upper or inner end of each inner section 36 is pivotably engaged with one of hubs 16, to provide movable mounting of lower frame 14 relative to hubs 16, and thereby relative to upper frame 12. With the configuration of lower frame 14 as shown and described, lower end frame member 32 defines a lower engagement area, located below the upper engagement area defined by upper frame end member 20, which is adapted for engagement with a vehicle at a location below upper frame end member 20.

Upper frame members 18 cooperate with lower side frame members 30 and hubs 20 to provide axial movement of upper frame 12 relative to lower frame 14. In this manner, the upper engagement area defined by upper frame end member 20 can be moved to a retracted position as shown in FIG. 2, which is adapted for use with a vehicle having a relatively flat rear end, such as a van, station wagon, minivan, sport utility vehicle or the like. The upper engagement are defined by upper frame 12 can also be moved to an extended position as shown in FIG. 3, which is adapted for use with a trunk-type vehicle such as a sedan or coupe.

Figure 4:
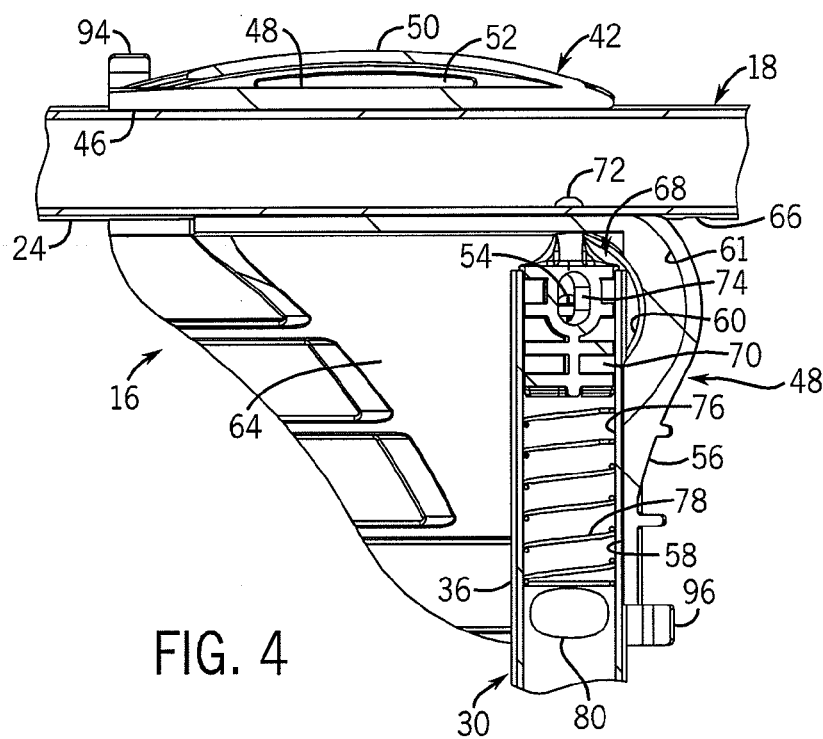
FIG. 4 is a partial section view of one of the hub members incorporated into the equipment carrier of FIG. 1, showing a first embodiment of a variable position engagement arrangement for fixing the position of the upper frame, in which the upper end of one of the frame members of the lower frame is in engagement with one of the upper frame members when the lower frame is in its operative position.

Referring to FIG. 4, each hub 16 defines an upper section 42 with which one of upper frame members 18 is engaged, and a lower section 44 with which the upper end of one of lower side frame members 30 is engaged. Each hub 16 may be formed of a thermoplastic material in an injection molding process, although it is understood that other materials and processes may be employed. Each hub 16 is preferably of one-piece construction, although each hub 16 may also be formed of a pair of sections that are secured together in a clamshell-type fashion.

Upper section 42 of each hub 16 includes an axial passage 46 defined by an annular passage wall 48. At its top, upper section 42 includes an axial wall 50 spaced outwardly from the outer surface of wall 48, to define a slot 52. Hub engagement section 24 of upper frame member 18 has an outside surface which is in close tolerance with the inside surface of wall 48 defining passage 46, and is slidably movable within passage 46 along a longitudinal front-rear axis coincident with that of passage 46 and hub engagement section 24 of upper frame member 18.

Figure 5:
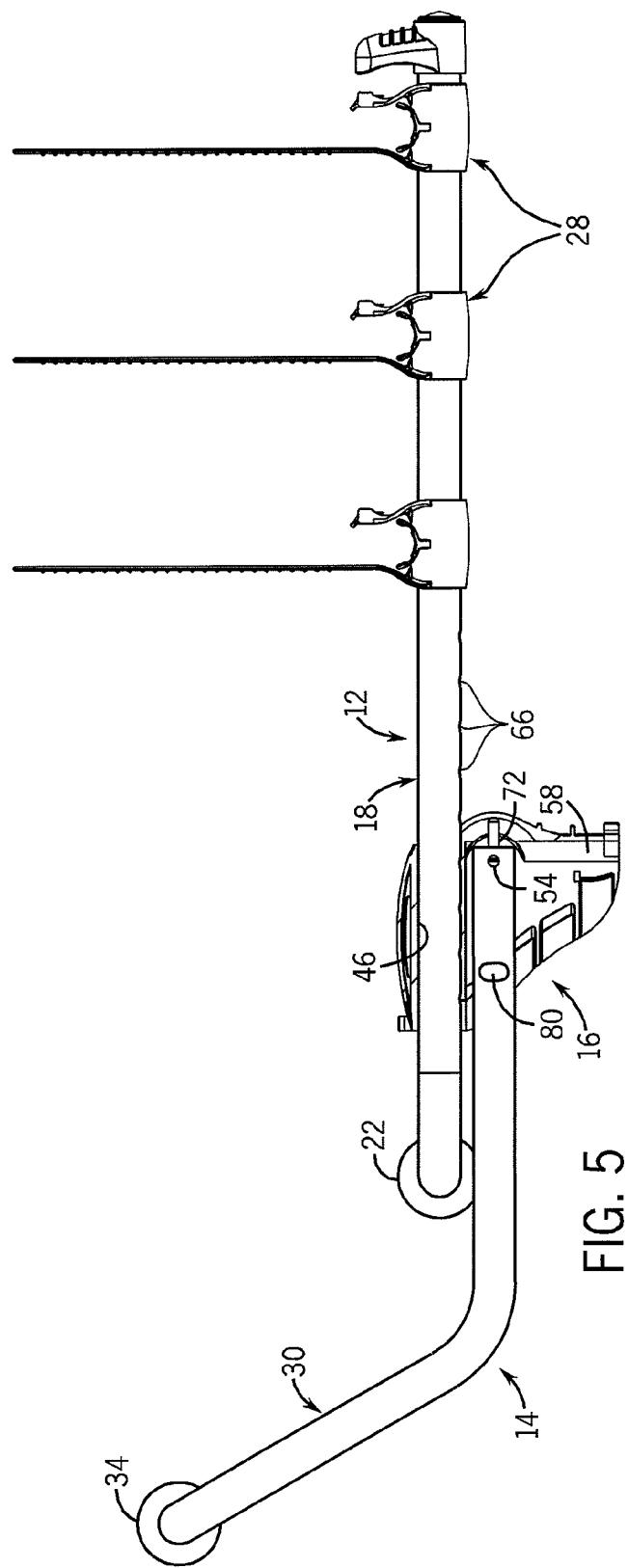
FIG. 5 is a side elevation view, partially in section, showing the lower frame in its inoperative collapsed position.

The upper or inner end of inner section 36 of each lower side frame member 30 is pivotably mounted to hub 16 below upper frame member 18 by means of a pivot pin 54. Pivot pin 54 defines a transverse pivot axis about which lower frame 14 is pivotable, for movement between an operative extended position as shown in FIGS. 1–4 and an inoperative collapsed position as shown in FIG. 5. Hub 16 includes an end wall 56 which forms an inwardly open engagement surface 58 that engages inner section 36 of side frame member 30 when lower frame 14 is in its extended operative position. Hub 16 further includes a pair of internal inner arcuate surface 60 above engagement surface 58, and an outer arcuate surface 61 located outwardly of and between inner arcuate surfaces 60. Hub 16 has a pair of spaced apart side walls 62 which cooperate to define a forwardly open internal space 64 within which inner section 36 of side frame member 30 is movable when lower frame 14 is moved between its operative extended position and its inoperative collapsed position.

A variable position engagement arrangement is operable to selectively fix the axial position of upper frame 12 relative to hubs 16, and thereby relative to lower frame 14, when lower frame 14 is moved to its operative extended position. The variable position engagement arrangement is disengaged from upper frame 12 when lower frame 14 is moved away from its operative extended position, to allow axial movement of upper frame 12 relative to hubs 16, and thereby relative to lower frame 14.

In the illustrated embodiment, the variable position engagement arrangement is in the form of a series of indentations or openings 66 formed in the downwardly facing surface of hub engagement section 24 of each upper frame member 18, in combination with an engagement member 68 that extends outwardly from the inner end of each lower side frame member 30. As shown, upper frame member 18 is a tubular member, and openings 66 are formed in the wall of upper frame member 18 so as to open into the internal passage defined by the upper frame member 18. Engagement member 68 is engageable within one of openings 66 when lower frame 14 is in its extended operative position, so as to prevent axial movement of upper frame member 18 relative to hub 16, and thereby to fix the axial position of upper frame 12 relative to lower frame 14.

Each lower side frame member 30 is preferably tubular in construction, and each engagement member 68 is mounted within the open upper end of one of lower side frame members 30. Engagement member 68 defines a ribbed plug section 70 and an engagement pin 72 that extends outwardly from the outer end of plug section 70. A transverse slot 74 is formed in plug section 70, and pivot pin 54 extends through slot 74. Engagement member 68 is axially movable within an internal passage, shown at 76, defined by the inner end of lower side frame member 30, between an extended operative position as shown in FIG. 4, and a retracted inoperative position as shown in FIG. 5. A spring 78 is positioned within passage 76, and is operable to bias engagement member 68 outwardly. The inner end of spring 78 bears against a spring retainer 80, which may be in the form of inward depressions formed in the walls of lower side frame member 30. It is understood, however, that any other type of satisfactory spring anchor or bearing member may be employed. The outer end of spring 78 bears against the underside of plug section 70.

In operation, the axial position of upper frame 12 relative to hub members 16 and lower frame 14 is fixed when lower frame 14 is in its operative extended position such that each engagement pin 72 is received within a selected one of openings 66 in one of upper frame members 18. In order to adjust the position of upper frame 12 relative to lower frame 14, so as to alter the position of the upper engagement area defined by upper frame end member 20 relative to the lower engagement area defined by lower end frame member 32, the user grasps upper frame 12 and lower frame 14 and pivots lower frame 14 away from its operative extended position of FIGS. 1–4, toward its inoperative collapsed position of FIG. 5. During such pivoting movement of lower frame 14 about pivot pins 54, inner arcuate surfaces 61 provide clearance for the end of each side frame member 30, and each engagement pin 72 is movable within the internal space defined by outer arcuate surface 61 between inner arcuate surfaces 60. The user need only pivot lower frame 14 a relatively slight amount about pivot pin 54 so as to disengage engagement pin 72 from opening 66, and the user can then adjust the axial position of upper frame 12 so as to place the upper engagement area defined by upper frame end member 20 in a desired axial position according to the configuration of the vehicle to which bicycle rack 10 is to be mounted. When the desired axial position of upper frame 12 has been attained, the user returns lower frame 14 to its extended operative position so as to move engagement pin 72 into a different one of openings 66, and to thereby fix the position of upper frame 12 relative to lower frame 14. In the event an opening 66 is not in alignment with engagement pin 72 when lower frame 14 is moved to its operative extended position, the upper end of engagement pin 72 engages the wall of upper frame member 18, and plug section 70 of engagement member 68 remains in a retracted position within passage 76 against the force of spring 78. The user then manually slides upper frame 12 slightly forwardly or rearwardly until one of openings 66 is brought into alignment with engagement pin 72. Spring 78 then functions to push plug section 70 outwardly within passage 76, to move engagement pin 72 into the opening 66. An audible click will result when engagement pin 72 is moved into the opening 66, which enables the user to know that upper frame 12 is fixed in position.

As shown in FIG. 2, hub engagement section 24 of upper frame member 18 has openings 66 positioned so as to enable the upper engagement area defined by upper end frame member 20 to be positioned in a rearward position substantially vertically above the lower engagement area of lower frame 14 defined by lower end frame member 32. This configuration enables bicycle rack 10 to be mounted to vehicles having a vertical or upright mounting surface 82, which is typically the case with vans, sport utility vehicles, minivans and the like. Similarly, upper frame 12 can be moved to a forward position as shown in FIG. 3, in which the upper engagement area defined by upper end frame member 20 is located forwardly of the lower engagement member defined by lower end frame member 32. This configuration enables bicycle rack 10 to be mounted to vehicles having a substantially horizontal engagement surface 84 as well as a vertical engagement surface 86, in which lower cushion member 34 is typically engaged at the intersection of vertical surface 86 with a horizontal surface 88, which may be defined by the vehicle bumper or the like.

When bicycle rack 10 is not in use, lower frame 14 is moved relative to hubs 16 and upper frame 12 to its collapsed inoperative position, as shown in FIG. 5. In this position, engagement pins 72 are again disengaged from openings 66, so as to enable upper frame 12 to be slid relative to hubs 16 so as to shorten the overall length of bicycle rack 10.

Figure 6:
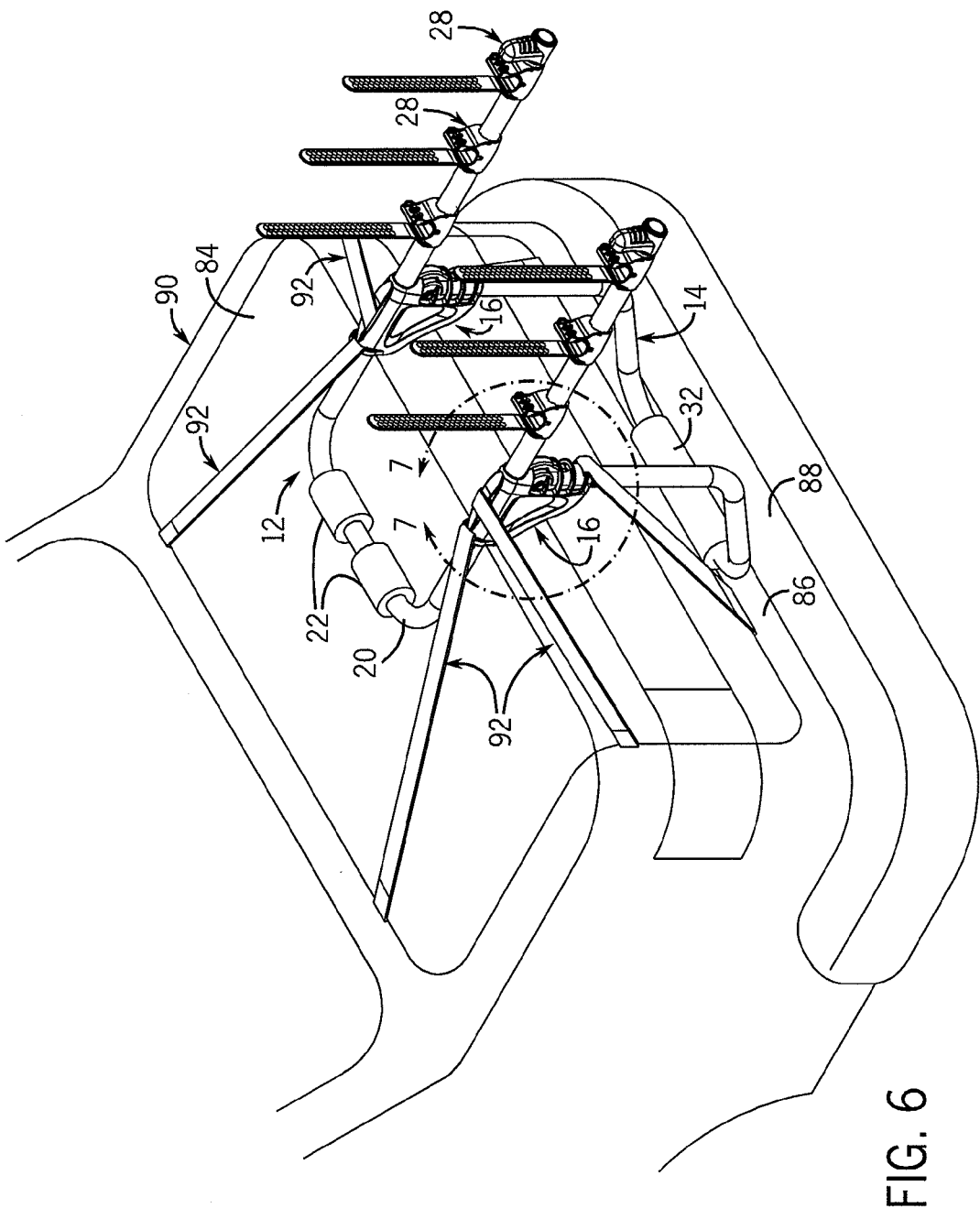
FIG. 6 is an isometric view of the equipment carrier of FIG. 1 as mounted to the rear area of a vehicle.
Figure 7:
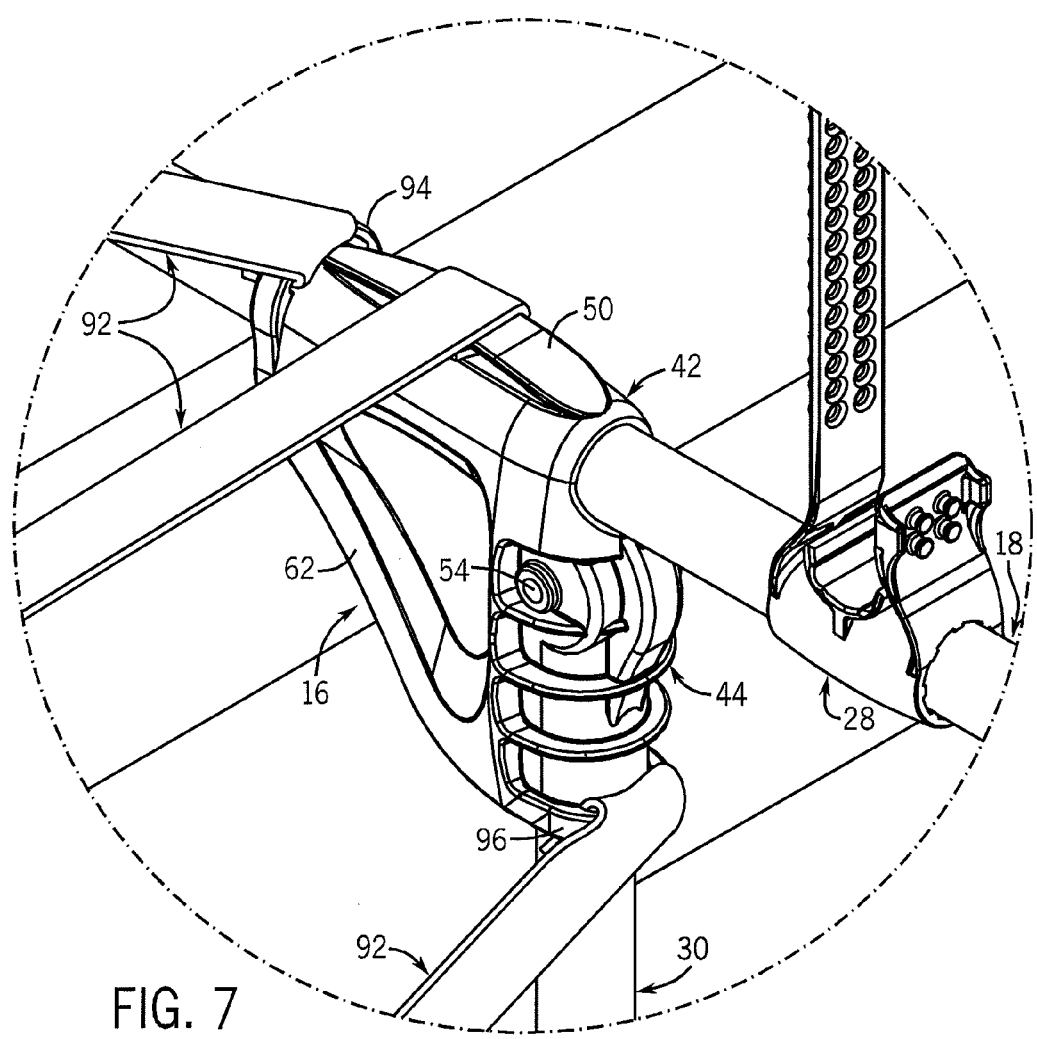
FIG. 7 is an enlarged partial isometric view with reference to line 7—7 of FIG. 6.

FIGS. 6 and 7 illustrate bicycle rack 10 as mounted to a vehicle, shown at 90. Vehicle 90 is a sedan or coupe-type vehicle, having a horizontal engagement surface 84 defined by the top wall of the trunk of vehicle 90, as well as a vertical engagement surface 86 and horizontal engagement surface 88, defined by the bumper of vehicle 90. A series of adjustable length straps 92 are engaged with and extend from each hub 16, for securing bicycle rack 10 to vehicle 90 in a known manner. A forward one of straps 92 defines an inner end that is looped about and engaged with a ring 94 located at the upper forward area of hub 16. A central one of straps 92 is engaged with axial wall 50 of hub 16, and is received within slot 52 defined by wall 50. A lower one of straps 92 is engaged with a downwardly facing lower ring 96 defined by hub 16. Alternatively, straps 92 may be secured to hub 16 by means of rivets or in any other manner, or many be connected to any other area of bicycle rack 10. With this construction, straps 92 are operable to securely mount bicycle rack 10 to vehicle 90, such that bicycles can be suspended from equipment support sections 26 of upper frame members 18 and engaged therewith via equipment support members 28.

Figure 8:
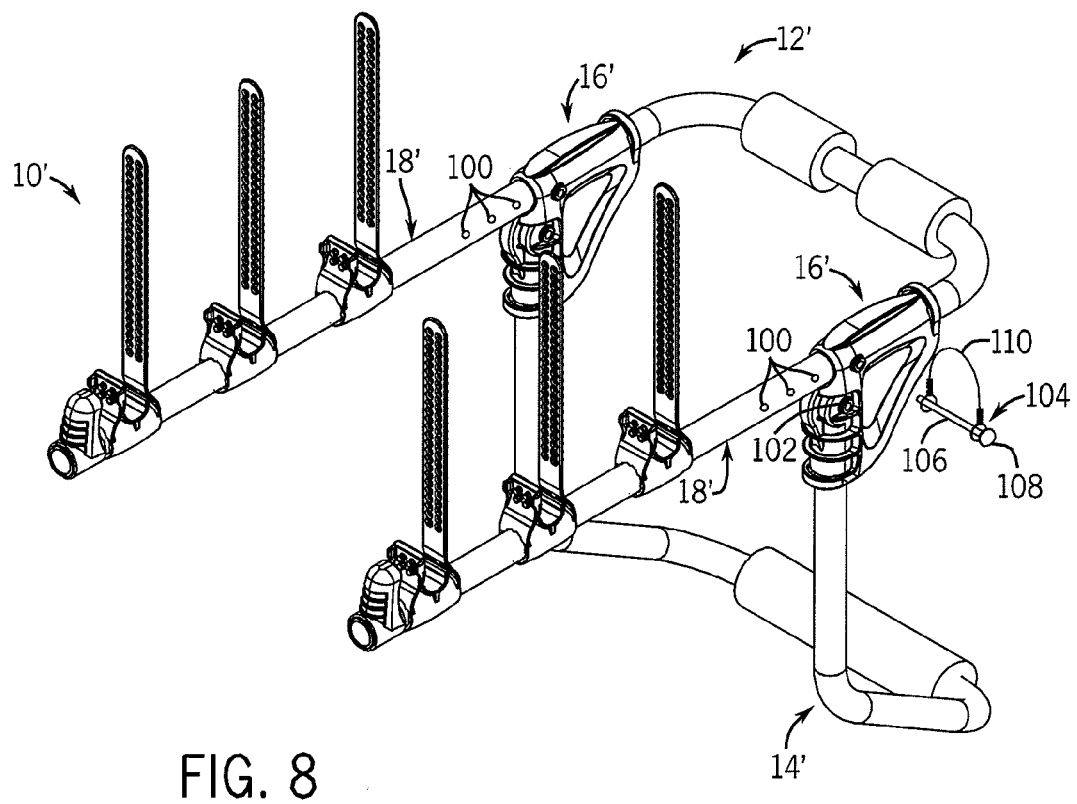
FIG. 8 is an isometric view similar to FIG. 1, showing another embodiment of a variable position engagement arrangement for fixing the position of the upper frame.
Figure 9:
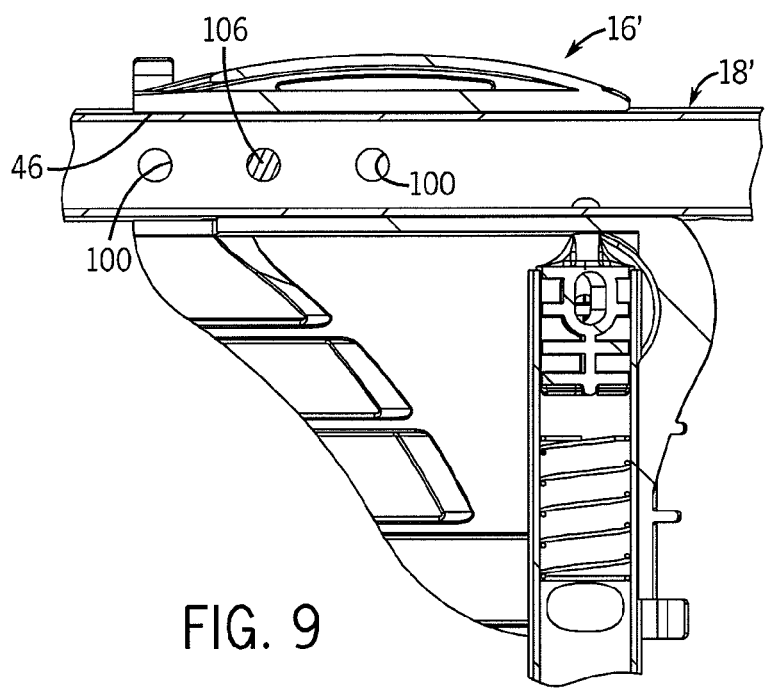
FIG. 9 is a view similar to FIG. 4, showing one of the hub members and portions of the upper and lower frame, in the embodiment of the variable position engagement arrangement of FIG. 8.

FIGS. 8 and 9 illustrate a bicycle rack 10' constructed generally similarly to bicycle rack 10, and like reference characters will be used where possible to facilitate clarity. In this embodiment, upper frame 12' includes upper frame members 18' which are slidably mounted within axial passages 46 defined by hubs 16'. Each upper frame member 18' includes a series of axially spaced apart transverse passages 100, in the form of aligned openings in the walls of upper frame members 18'.

Each hub 16' also includes a transverse passage, which opens into axial passage 46. Each hub 16' includes a pair of aligned bosses 102 on its opposite sides, and the transverse passage in hub 16' is defined by aligned passages formed in bosses 102. Upper frame 12' is adapted to be positioned relative to hubs 16' such that a selected one of passages 100 is placed into alignment with the passages in bosses 102'. A pin-type engagement member 104 includes a shank 106 that extends through the passages in bosses 102 and through the aligned one of passages 100, to fix the axial position of upper frame 12' relative to hubs 16'. Each retainer pin 104 includes a head 108 as well as a conventional resilient spring clip 110 to maintain retainer pin 104 in engagement with hub 16' and upper frame member 18'.

With this arrangement, engagement member 68 is eliminated from the upper end of side frame member 30, such that lower frame 14' is movable between its operative extended position and its inoperative collapsed position without interaction with upper frame 18'. The axial position of upper frame 12' can thus be adjusted to any position as desired by selective engagement of retainer pin 104 within a selected one of transverse passages 100, while enabling lower frame 14' to be selectively extended for use and collapsed for storage.

While the invention has been shown and described with respect to a particular embodiment, it is understood that various alternatives and modifications are contemplated as being within the scope of the present invention and covered by the appended claims. Such alternatives and modifications include, but are not limited to, the following. While the invention has been shown in connection with a bicycle rack, it is understood that the invention may be incorporated in any type of carrier adapted for removable mounting to a vehicle and for supporting any type of equipment on the vehicle during transport. In addition, while upper frame 12 and lower frame 14 are illustrated as being in the form of U-shaped frames having a pair of side frame members, it is understood that the invention is capable of being used in connection with any type of frame arrangement, e.g. one in which the upper and/or lower frames are formed of a single frame member or a series of frame members. While each hub engagement section 24 has been shown and described as having openings 66, it is also understood that openings 66 may only be formed in only one of hub engagement sections 24. Further, while engagement member 68 has been shown and described as being movable between a retracted position and an extended position, it is also contemplated that a fixed engagement member may be secured to the end of the lower side frame member. In an arrangement such as this, the user must position the upper frame relative to the lower frame so that it is ensured that an opening is in alignment with the engagement member so as to receive the engagement member when the lower frame is moved to its operative extended position. Preferably, this embodiment incorporates a detent arrangement between hub 16 and hub engagement sections 24 of upper frame 12, so as to ensure alignment of the engagement member with one of openings 66 when the lower frame is moved to its operative extended position. Further, while the engagement mechanism between the upper frame and lower frame is illustrated as being in the form of a pin engageable within one of a series of openings, it is understood that any other type of releasable and variable position engagement arrangement may be employed in place of this type of pin-end-opening system. For example, a series of axially spaced teeth may be associated with upper frame member 18, and the engagement arrangement may be engageable with one or more of the teeth so as to fix the position of the upper frame relative to the lower frame. In addition, it is also understood that movement of the lower frame to its extended operative position may actuate a separate engagement arrangement associated with the hub and which is engageable with the upper frame member, rather than engagement member 68 that is mounted directly to the lower frame member for engagement with the upper frame member.

Rack 10 may also be used in an inverted orientation, wherein upper frame 12 and its associated end member 20 and cushion members 22 are supported by the horizontal engagement surface 88 of the vehicle, and lower frame 14 extends upwardly from upper frame 12. In this orientation, frame 12 is the lower frame and frame 14 is the upper frame. When arranged in this manner, rack 10 may be used to carry a wheelchair or the like, or may be used to carry other types of equipment in a tray-type manner (i.e. providing support from below) rather than in a suspension-type manner as shown and described.

Various alternatives and embodiments are contemplated as being within the scope of the following claims particularly pointing out and distinctly claiming the subject matter regarded as the invention.

I claim:

1. An equipment carrier adapted for removable mounting to the rear of a vehicle, comprising:
   a first frame arrangement having a forward area adapted for engagement with the vehicle and a rearward area adapted to support one or more items of equipment;
   a second frame arrangement having an inner end area and an outer end area, wherein the outer end area is adapted for engagement with the vehicle at a location vertically spaced from the forward area of the first frame arrangement;
   a pivot hub arrangement interposed between the first frame arrangement and the inner end of the second frame arrangement, wherein the second frame arrangement is pivotably mounted to the pivot hub arrangement for movement relative to the first frame arrangement between an extended operative position and a collapsed inoperative position, and wherein the pivot hub arrangement includes axially extending passage structure within which the first frame arrangement is movably received for providing adjustment in the axial position of the pivot hub arrangement relative to the first frame arrangement, wherein the axially extending passage structure and the first frame arrangement are configured to maintain the first frame arrangement in a fixed and non-adjustable angular relationship upon movement of the first frame arrangement in the passage structure to provide adjustment in the axial position of the first frame arrangement relative to the pivot hub arrangement; and a selective engagement arrangement interposed between the pivot hub arrangement and the first frame arrangement for selectively fixing the axial position of the first frame arrangement relative to pivot hub arrangement and thereby the second frame arrangement, wherein the selective engagement arrangement is operable to selectively enable axial movement of the first frame arrangement in a forward-rearward direction relative to the pivot hub arrangement, and is operable to selectively fix the axial position of the first frame arrangement relative to the pivot hub arrangement.

2. The equipment carrier of claim 1, wherein the first frame arrangement includes one or more axial frame members and wherein the second frame arrangement includes one or more outwardly extending frame members, each of which extends outwardly from one of the axial frame members when the second frame arrangement is in its extended operative position, and wherein the pivot hub arrangement comprises a hub member interposed between and engaged with each axial frame member and its associated outwardly extending frame member.

3. The equipment carrier of claim 2, wherein the pivot hub arrangement comprises a pivot connection between each hub member and its associated outwardly extending frame member located toward an inner end defined by the outwardly extending frame member.

4. An equipment carrier adapted for removable mounting to the rear of a vehicle, comprising:

a first frame arrangement having a forward area adapted for engagement with the vehicle and a rearward area adapted to support one or more items of equipment;

a second frame arrangement having an inner end area and a an outer end area, wherein the outer end area is adapted for engagement with the vehicle at a location vertically spaced from the forward area of the first frame arrangement;

a pivot arrangement interposed between the first frame arrangement and the inner end of the second frame arrangement, wherein the second frame engagement is pivotably mounted to the pivot arrangement for movement relative to the first frame arrangement between an extended operative position and a collapsed inoperative position;

wherein the first frame arrangement includes one or more axial frame members and wherein the second frame arrangement includes one or more outwardly extending frame members, each of which extends outwardly from one of the axial frame members when the second frame arrangement is in its extended operative position, and wherein the pivot arrangement comprises a hub member interposed between and engaged with each axial frame member and its associated outwardly extending frame member, wherein the pivot arrangement comprises a pivot connection between each hub member and its associated outwardly extending frame member located toward an inner end defined by the outwardly extending frame member; and a variable position engagement arrangement interposed between the pivot arrangement and the first frame arrangement for varying the position of at least the forward area of the first frame arrangement relative to the second frame arrangement, wherein the variable position engagement arrangement is operable to selectively enable movement of the first frame arrangement relative to the pivot arrangement, and is operable to selectively fix the position of the first frame arrangement relative to the pivot arrangement;

wherein each axial frame member is slidably mounted within a passage defined by one of the hub members for varying the position of the second frame arrangement relative to the first frame arrangement.

5. The equipment carrier of claim 4, wherein the variable position engagement arrangement comprises a series of axially spaced openings in at least one of the axial frame members, and a removable engagement member that is selectively engageable within one or more of the openings to fix the position of the first frame member relative to its associated hub member.

6. The equipment carrier of claim 5, wherein the variable position engagement arrangement is operable to enable movement of each axial frame member relative to the hub member when the second frame arrangement is moved away from its operative position, and is operable to fix the position of each axial frame member relative to the hub member when the second frame arrangement is in its operative position, and wherein the engagement member extends from an inner end defined by each outwardly extending frame member, and wherein the engagement member is adapted to be received within one of the axially spaced openings when the second frame arrangement is in its operative position so as to fix the position of the first frame arrangement relative to the second frame arrangement.

7. The equipment carrier of claim 6, further comprising a biasing arrangement associated with the engagement member for biasing the engagement member outwardly relative to the inner end of the outwardly extending frame member, wherein the biasing arrangement enables the engagement member to move inwardly relative to the inner end of the outwardly extending frame member when the second frame arrangement is moved to its operative position and the engagement member is located between a pair of the axially spaced openings and engages the axial frame member.

8. The equipment carrier of claim 5, wherein the hub member includes a transverse passage and wherein the axial frame member is adapted to be positioned such that one of the axially spaced openings is in alignment with the transverse passage, and wherein the engagement member comprises a removable pin adapted for engagement within the transverse passage in the hub member and within one of the axially spaced openings in the axial frame member to selectively fix the position of the axial frame member relative to the hub member.

9. In an equipment carrier adapted for mounting to a vehicle, including a first frame arrangement having a forward end engageable with the vehicle and a rearward end adapted to support one or more items of equipment, and a second frame arrangement defining an outer end engageable with the vehicle at a location vertically spaced from the forward end of the first frame arrangement, the improvement comprising a pivot hub arrangement interposed between the first frame arrangement and the second frame arrangement, wherein the second frame arrangement is pivotably mounted to the pivot hub arrangement for movement relative to the first frame arrangement between an inoperative collapsed position in which the second frame arrangement is positioned toward the first frame arrangement, and an operative extended position in which the second frame arrangement extends outwardly away from the first frame arrangement, and wherein the pivot hub arrangement includes axially extending passage structure within which the first frame arrangement is movably received for providing adjustment in the axial position of the pivot hub arrangement relative to the first frame arrangement, wherein the axially extending passage structure and the first frame arrangement are configured to maintain the first frame arrangement in a fixed and non-adjustable angular relationship upon movement of the first frame arrangement in the passage structure to provide adjustment in the axial position of the first frame arrangement relative to the pivot hub arrangement, and a selective engagement arrangement interposed between the pivot hub arrangement and the first frame arrangement, wherein the selective engagement arrangement enables selective adjustment in the axial position of the first frame arrangement relative to the pivot hub arrangement and thereby the second frame arrangement.

10. The improvement of claim 9, wherein the pivot hub arrangement comprises one or more pivot hub members interposed between the first frame arrangement and the second frame arrangement, wherein the second frame arrangement is pivotably mounted to the one or more pivot hub members for movement between its operative extended position and its inoperative collapsed position.

11. In an equipment carrier adapted for mounting to a vehicle, including a first frame arrangement having a forward end engageable with the vehicle and a rearward end adapted to support one or more items of equipment, and a second frame arrangement defining an outer end engageable with the vehicle at a location vertically spaced from the forward end of the first frame arrangement, the improvement comprising a movable mounting arrangement interposed between the first frame arrangement and the second frame arrangement for providing movement of the second frame arrangement relative to the first frame arrangement between an inoperative collapsed position in which the second frame arrangement is positioned toward the first frame arrangement, and an operative extended position in which the second frame arrangement extends outwardly away from the first frame arrangement, and a variable position engagement arrangement interposed between the first and second frame arrangements, wherein the variable position engagement arrangement enables selective adjustment in the position of the first frame arrangement relative to the second frame arrangement, wherein the movable mounting arrangement comprises one or more hub members interposed between the first frame arrangement and the second frame arrangement, wherein the second frame arrangement is pivotably mounted to the one or more hub members for movement between its operative extended position and its inoperative collapsed position, and wherein the first frame arrangement is engaged within passage structure defined by the one or more hub members for providing sliding movement of the first frame arrangement relative to the one or more hub members and the second frame arrangement.

12. The improvement of claim 11, wherein the variable position engagement arrangement is operable to provide adjustment in the position of the first frame arrangement relative to the second frame arrangement to one of a plurality of predetermined positions.

13. The improvement of claim 12, wherein the first frame arrangement comprises one or more axial frame members, each of which is engaged with one of the hub members, and wherein the variable position engagement arrangement comprises a plurality of axially spaced engagement areas formed in at least one of the axial frame members, and an engagement member associated with at least one of the hub members and which is movable between an engaged position, in which the engagement member is engaged within one of the engagement areas in the axial frame member to fix the position of the first frame arrangement relative to the second frame arrangement, and a disengaged position in which the engagement member is moved out of engagement with the engagement area so as to allow relative movement between the first frame arrangement and the hub member.

14. The improvement of claim 13, wherein the variable position engagement arrangement enables adjustment in the position of the first frame arrangement relative to the second frame arrangement when the second frame arrangement is moved away from its operative extended position, and is operable to fix the position of the first frame arrangement relative to the second frame arrangement when the second frame arrangement is moved to its operative extended position, and wherein the second frame arrangement includes an outwardly extending frame member that is pivotably engaged with each hub member, and wherein the engagement arrangement is responsive to movement of an inner end of each outwardly extending frame member when the second frame arrangement is moved between its operative position and its inoperative position, for selectively positioning the engagement member in its engaged and disengaged positions.

15. The improvement of claim 14, wherein the engagement member comprises a pin member extending from the inner end defined by each outwardly extending frame member and wherein the engagement areas comprise openings in the axial frame member, wherein the pin member is movable to the engaged position within one of the openings when the second frame arrangement is in its operative position, and is movable out of engagement with the opening to the disengaged position when the second frame arrangement is in its inoperative position.

16. The improvement of claim 15, further comprising a biasing member interposed between the outwardly extending frame member and the pin for urging the pin outwardly relative to the inner end of the outwardly extending frame member.

17. The improvement of claim 13, wherein the engagement member comprises a removable pin member adapted to extend through a passage associated with the hub member and into engagement with one of the axially spaced engagement areas.

18. An equipment carrier adapted for mounting to the rear of a vehicle, comprising:
 a first member having a forward engagement area adapted for engagement with the vehicle;
 a second member having an outer engagement area adapted for engagement with the vehicle at a location vertically spaced from the forward engagement area of the first member, wherein the first member is axially movable relative to second member to adjust the position of the forward engagement area of the first member relative to the outer engagement area of the second member;
 a pivot hub arrangement interposed between the first and second members;
 wherein the second frame member is pivotably mounted to the pivot hub arrangement for movement relative to the first frame member between an extended operative position and a collapsed inoperative position, and wherein the pivot hub arrangement includes axially extending passage structure within which the first frame arrangement is movably received for providing adjustment in the axial position of the pivot hub arrangement relative to the first frame arrangement, wherein the axially extending passage structure and the first frame arrangement are configured to maintain the first frame arrangement in a fixed and non-adjustable angular relationship upon movement of the first frame arrangement in the passage structure to provide adjustment in the axial position of the first frame arrangement relative to the pivot hub arrangement;

a selective engagement arrangement interposed between the pivot hub arrangement and the first frame member for varying the axial position of at least the forward area of the first frame member relative to the second frame member, wherein the selective engagement arrangement is operable to selectively enable axial movement of the first frame member in a forward-rearward direction relative to the pivot hub arrangement, and is operable to selectively fix the axial position of the first frame member relative to the pivot hub arrangement; and an equipment carrying arrangement supported by the first and second members such that the first and second members cooperate to support the equipment carrying arrangement on the vehicle.

19. The equipment carrier of claim 18, wherein the selective engagement arrangement includes an engagement pin adapted to extend through an opening associated with the pivot hub arrangement and into engagement with one of a plurality of axially spaced openings associated with the first member.

20. An equipment carrier adapted for mounting to the rear of a vehicle, comprising:
 a first member having a forward engagement area adapted for engagement with the vehicle;
 a second member having an outer engagement area adapted for engagement with the vehicle at a location vertically spaced from the forward engagement area of the first member, wherein the first member is axially movable relative to second member to adjust the position of the forward engagement area of the first member relative to the outer engagement area of the second member;
 an engagement arrangement interposed between the first and second members for selectively fixing the axial position of the first member relative to the second member, wherein the engagement arrangement includes a hub arrangement interposed between the first and second members, wherein the second member is mounted to the hub arrangement for movement between an operative extended position and an inoperative collapsed position by means of a pivot connection of the second member to the hub arrangement, and wherein the first member is axially movable relative to the second member via movable engagement of the first member with the hub arrangement, wherein the first member is received within passage structure associated with the hub arrangement for providing axial movement of the first member relative to the hub arrangement and thereby relative to the second member; and
 an equipment carrying arrangement supported by the first and second members such that the first and second members cooperate to support the equipment carrying arrangement on the vehicle.

21. The equipment carrier of claim 20, wherein the engagement arrangement comprises a plurality of axially spaced openings associated with the first member, and an engagement member engageable within one of the openings to selectively fix the axial position of the first member relative to the hub arrangement.

22. The equipment carrier of claim 20, wherein the engagement arrangement further includes engagement structure associated with the second member which is configured to engage the first member when is in its operative extended position to fix the position of the first member within the passage structure, and to release engagement of the first member when moved away from its operative extended position to allow movement of the first member within the passage structure.

23. The equipment carrier of claim 22, wherein the engagement structure comprises an engagement member that extends outwardly from an inner end defined by the second member and which is engageable with one of a series of spaced openings associated with the first member.

24. The equipment carrier of claim 23, wherein the second member is mounted to the hub arrangement for movement between its operative and inoperative positions by means of a pivot connection which provides movement of the second member about a pivot axis relative to the first member, and wherein the engagement member and the outer engagement area of the second member are located on opposite sides of the pivot axis.

25. An equipment carrier adapted for removable mounting to the rear of a vehicle, comprising:
 a first frame arrangement having a forward area adapted for engagement with the vehicle and a rearward area adapted to support one or more items of equipment;
 a second frame arrangement having an inner end area and an outer end area, wherein the outer end area is adapted for engagement with the vehicle at a location vertically spaced from the forward area of the first frame arrangement;
 a pivot hub arrangement interposed between the first frame arrangement and the inner end of the second frame arrangement, wherein the second frame arrangement is pivotably mounted to the pivot hub arrangement for movement relative to the first frame arrangement between an extended operative position and a collapsed inoperative position, and wherein the first frame arrangement and the pivot hub arrangement include an axially adjustable mounting arrangement that is configured and arranged to enable adjustment in the axial position of the pivot hub arrangement relative to the first frame arrangement and to maintain the first frame arrangement in a fixed and non-adjustable angular relationship upon adjustment in the axial position of the first frame arrangement relative to the pivot hub arrangement; and
 a selective engagement arrangement interposed between the pivot hub arrangement and the first frame arrangement for selectively fixing the axial position of the first frame arrangement relative to pivot hub arrangement and thereby the second frame arrangement, wherein the selective engagement arrangement is operable to selectively enable axial movement of the first frame arrangement in a forward-rearward direction relative to the pivot hub arrangement, and is operable to selectively fix the axial position of the first frame arrangement relative to the pivot hub arrangement;
 wherein the first frame arrangement includes one or more axial frame members and wherein the second frame arrangement includes one or more outwardly extending frame members, each of which extends outwardly from one of the axial frame members when the second frame arrangement is in its extended operative position, and wherein the pivot hub arrangement comprises a hub member interposed between and engaged with each axial frame member and its associated outwardly extending frame member, wherein each axial frame member is slidably mounted within a passage defined by one of the hub members for varying the position of the second frame arrangement relative to the first frame arrangement; and wherein the pivot hub arrangement comprises a pivot connection between each hub member and its associated outwardly extending frame member located toward an inner end defined by the outwardly extending frame member.

26. In an equipment carrier adapted for mounting to a vehicle, including a first frame arrangement having a forward end engageable with the vehicle and a rearward end adapted to support one or more items of equipment, and a second frame arrangement defining an outer end engageable with the vehicle at a location vertically spaced from the forward end of the first frame arrangement, the improvement comprising one or more pivot hub members interposed between the first frame arrangement and the second frame arrangement, wherein the second frame arrangement is pivotably mounted to the one or more pivot hub members for movement relative to the first frame arrangement between an inoperative collapsed position in which the second frame arrangement is positioned toward the first frame arrangement, and an operative extended position in which the second frame arrangement extends outwardly away from the first frame arrangement, and wherein the first frame arrangement and the one or more pivot hub members include an axially adjustable mounting arrangement that is configured and arranged to enable adjustment in the axial position of the one or more pivot hub members relative to the first frame arrangement and to maintain the first frame arrangement in a fixed and non-adjustable angular relationship upon adjustment in the axial position of the first frame arrangement relative to the one or more pivot hub members, and a selective engagement arrangement interposed between the one or more pivot hub members and the first frame arrangement, wherein the selective engagement arrangement enables selective adjustment in the axial position of the first frame arrangement relative to the one or more pivot hub members and thereby the second frame arrangement, wherein the first frame arrangement is engaged within passage structure defined by the one or more pivot hub members for providing sliding movement of the first frame arrangement within the passage structure relative to the one or more pivot hub members and the second frame arrangement, and wherein selective engagement arrangement is operable to provide adjustment in the position of the second frame arrangement relative to the one or more pivot hub members to one of a plurality of predetermined positions within the passage structure.

* * * * *